United States Patent

Feldman

[15] 3,675,480
[45] July 11, 1972

[54] PRESSURE DEMAND METER FOR FLUID FLOW MEASUREMENT

[72] Inventor: Stephen Lew Feldman, Baltimore, Md.
[73] Assignee: Envirometrics, Inc.
[22] Filed: June 11, 1970
[21] Appl. No.: 45,329

Related U.S. Application Data

[63] Continuation-in-part of Ser. No. 17,073, March 6, 1970.

[52] U.S. Cl. ................................................73/199
[51] Int. Cl. ............................................G01f 1/02
[58] Field of Search ..........................73/199, 198

[56] References Cited

UNITED STATES PATENTS

| | | | |
|---|---|---|---|
| 1,957,010 | 5/1934 | Chirol | 324/116 |
| 2,650,026 | 8/1953 | Amsbary, Jr. et al. | 324/103 X |
| 2,307,888 | 1/1943 | Highfield | 73/199 X |

FOREIGN PATENTS OR APPLICATIONS

| | | | |
|---|---|---|---|
| 16,568 | 12/1884 | Great Britain | 73/230 |

*Primary Examiner*—Jerry W. Myracle
*Attorney*—Le Blanc and Shur

[57] ABSTRACT

The meter includes a quantity meter, pressure measuring device and a register. The outputs of the pressure measuring device and quantity meter are correlated to provide a numerical readout at the register proportional to the pressure of the fluid in the fluid line and a quantity of flow whereby demand on the fluid system is reflected in the quantity readout.

8 Claims, 6 Drawing Figures

INVENTOR
STEPHEN L. FELDMAN

BY LeBlanc & Shur
ATTORNEYS

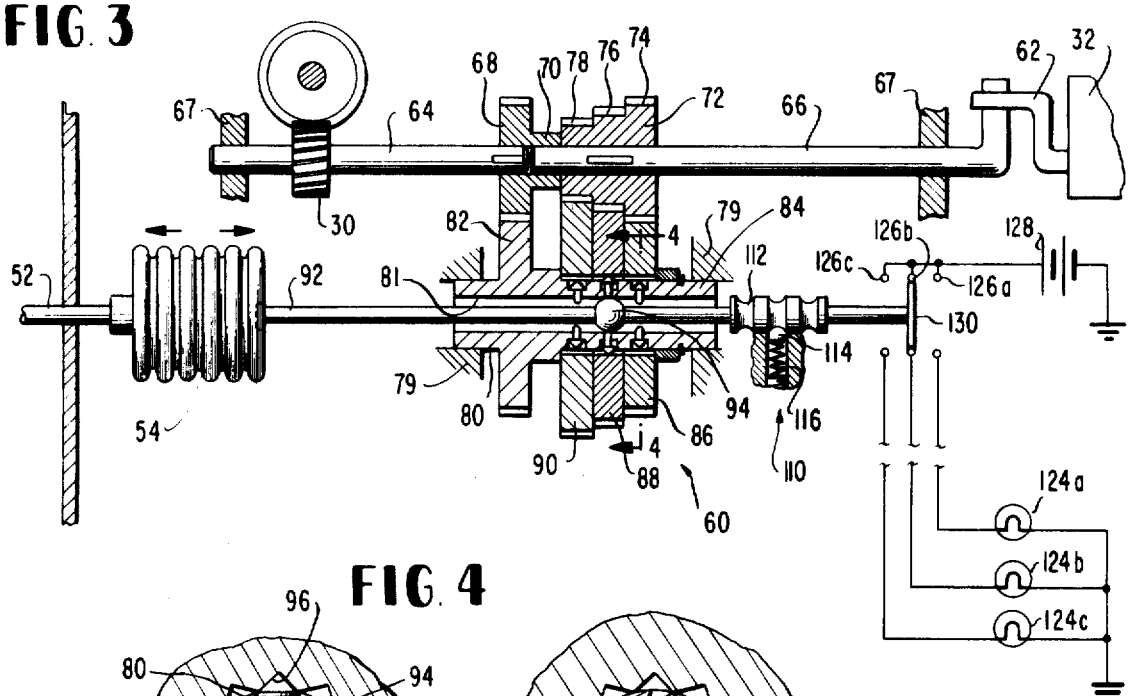
FIG. 3
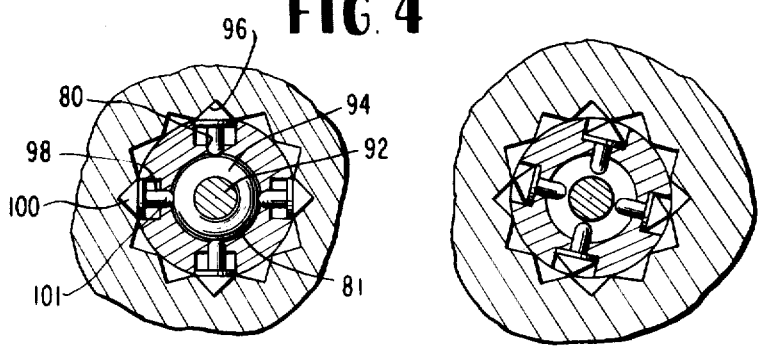
FIG. 4
FIG. 5
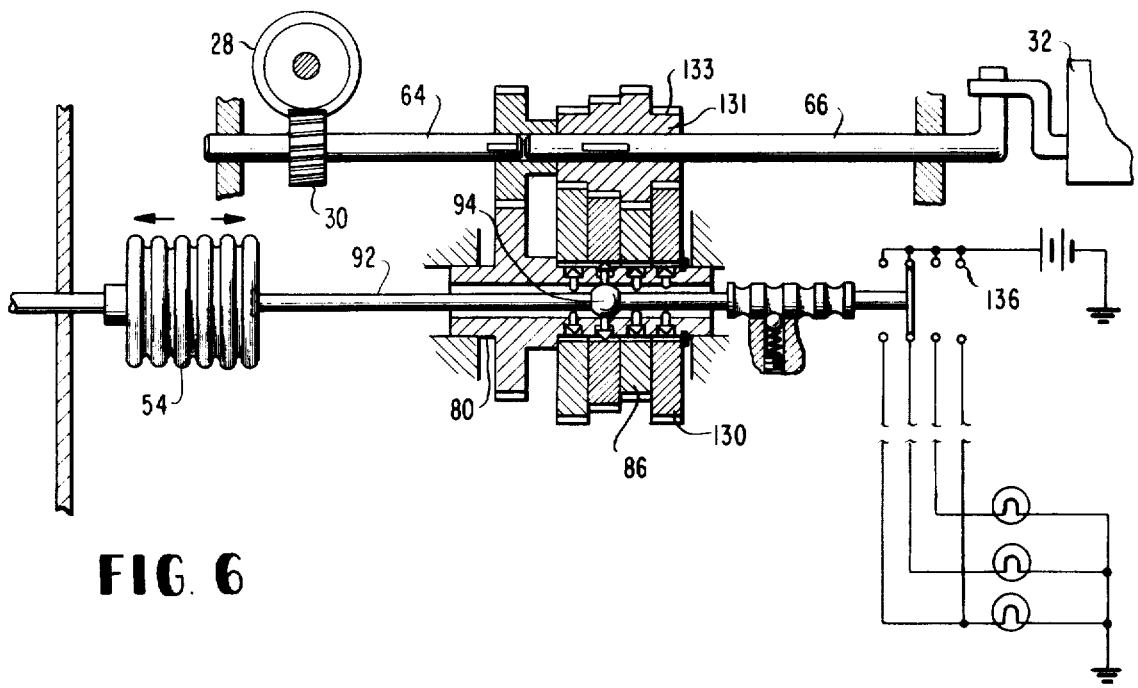
FIG. 6

PRESSURE DEMAND METER FOR FLUID FLOW MEASUREMENT

This application is a continuation-in-part of application Ser. No. 17,073 filed Mar. 6, 1970.

The present invention relates to methods and apparatus including a device for measuring characteristics of fluid flow and particularly relates to methods and apparatus for reflecting overall demand in a gas distribution system in the readout of actual quantity of gas passing through a given portion of the system in any given time interval. Particularly, the present invention provides methods and apparatus for correlating the volume or quantity of gas passing through a specified gas line in any given time interval, with the pressure (demand) of the gas in the distribution system whereby an output reflecting demand on the system and quantity of gas flowing through the measuring device in the specified line can be registered. The present invention also relates to the provision of a remote indicator whereby a gas consumer can obtain knowledge of the relative cost of gas should he utilize gas at that time in preference to another time.

In providing natural gas to consumers, the gas system, including production, and pipeline facilities, is constructed with a capacity to meet peak loads on the system at any given time. In certain distribution systems, gas is stored in gas holders for use in packing the distribution lines during periods of peak demand. Depending upon the geographic location of the gas distribution system, production and/or pipeline and/or gas storage facilities may be used exclusively or the gas storage facilities may be employed to supplement the production and/or pipeline facilities during peak demands. As can be demonstrated, the demand for natural gas varies greatly during any one day and shows wide seasonal fluctuations, with the maximum rate of use usually occurring in December or January. Accordingly, in many systems the natural gas production plant, where locally manufactured gas is sold, or the pipeline facilities where natural gas is piped in for local distribution, is usually operated on a steady 24 hour basis with gas being drawn from gasholders to meet peak demand periods and flowing into the gasholders during off peak demand periods. The distribution network has, of course, sufficient capacity to accommodate the peak hour rate of consumption and the combination of gas production (or pipeline) and storage facilities is sufficient to provide for peak rate of consumption and the daily maximum.

Since gas can be stored, the needed production or pipeline capacity varies with the total quantity of gas consummed each day or each week, but the storage capacity necessarily depends upon the shape of the relevant demand on the system. In practice, the requirements for natural gas are not constant but show wide seasonal variations, especially where the gas is used for space heating. In these situations, the distribution system must be sufficiently large to handle the peak seasonal rate of consumption and maintain the pressure within a required range. The gas mains must be sufficiently large so that the gas can be transmitted without undue pressure loss. Further, variations in demand for natural gas occur on a daily and even hourly basis. For example, demands for gas based on water heating, and cooking requirements normally occur at specified predictable times during the day. As a result of this customary pattern of gas usage, conventional gas systems must be and are constructed to provide gas during peak demand periods to meet the variable demands of consumers.

In pricing gas to the consumer, gas company charges are often determined by a rate schedule based on quantity of gas utilized by the consumer, i.e., either a uniform rate per thousand cubic feet or a block schedule with the rate per thousand cubic feet decreasing by blocks as the total quantity purchased increases with a given maximum rate of consumption. Usually the gas is metered with the gas company merely periodically reading the meter and determining the charge to the consumer, the meter being based on a quantity or volume of gas utilized by the consumer. The marginal cost of gas to a low gas consumer with the foregoing pricing structure is greater than the marginal cost which accrues to a high gas consumer. The former, in effect, inequitably subsidizes the latter and the high gas consumer is not charged his proportionate share of his cost to the system which should be in proportion to the extent that the gas system (production, storage and distribution facilities) must be ready to provide gas to him.

The present invention provides a novel and unique gas measuring device having an output which is a function of both the overall demand on the gas system at any particular time and the total quantity of gas utilized in a specified portion of the system, i.e., by a particular user. Consequently, a gas user may be charged not only in accordance with the quantity of gas actually utilized but also in accordance with the degree to which he taxes the gas system in providing him with gas at any specified time. The present invention utilizes the pressure in the gas system as an indicator of gas usage and correlates it with the quantity of gas actually utilized by a consumer to register demand-quantity units directly proportional to the volume of gas utilized and inversely proportional to the gas system pressure where production and/or pipeline facilities are exclusively utilized and directly proportional to the system pressure where gasholders are utilized to supplement the gas flowing into the distribution system from the production and/or pipeline facilities. Thus the price structure is based both on quantity utilized and demand on the system at the time of use. For example, should a gas user utilize the gas system at a time when system demand is high, the measuring device of the present invention will register a value directly proportional to the quantity actually utilized and the system demand at that time which value would be higher than if the same quantity of gas was utilized during some intermediate or lower demand period. The increased indication registered for gas usage at peak or high demand periods will thus cause an increase in the consumer's marginal cost in comparison with his marginal cost for the same quantity of gas during a low demand period. The cost to the consumer is thus directly related to system demand and he will bear directly the added cost of his demand during peak or high system demand periods resulting in a marketable distribution of costs.

While situations vary in the degree to which consumers can be informed of and react to changes in rates that would reflect changes in their marginal costs, such information, in accordance with the present invention, is made available to the gas consumer at the time that he makes his decision to use or not to use gas in such a way as to make possible a significant increase in the efficiency of utilization of the gas system and consequently a lower average level of rates and a more equitable distribution of prices in tune with costs. The measuring device hereof includes a remote indicator for the gas consumer which will inform him of the demand placed on the system by other users. Thus, prior to utilizing any gas, and at the time that the decision to use or not to use gas is being made, the consumer is provided with an indication of his marginal cost should he utilize the gas system at that time. That is to say, the gas consumer is informed of the relative costs to him should he utilize gas at that time as compared with the costs of utilization of gas at other times and at other demand periods. By educating gas consumers to be responsive to variations in marginal costs, the effect is to level off peaks of demand and fill in troughs of demand resulting in higher utilization ratios and lower average rate levels. This demand responsive pricing structure has the further benefit that it will increase the number of gas company customers who receive uninterruptable service (interruptable gas customers are those who buy gas on the understanding that their consumption may be cut off on short notice when production capacity is needed in order to meet requirements from "firm" customers). Also, excess capacity can be saved in the form of underground storage tanks, less compressor horsepower, smaller pipeline diameters etc. resulting in extending the time horizon of present facilities, i.e. postponing construction of new facilities.

Accordingly, it is a primary object of the present invention to provide a novel demand measuring device for gas distribution systems.

It is another object of the present invention to provide a device for measuring quantity and demand characteristics of gas flow in a gas distribution system.

It is another object of the present invention to provide a quantity demand meter for measuring both the quantity of flow in a gas line and the pressure of the gas in the line and correlating the two measurements to register units directly proportional to the quantity of gas flow in the line and either directly or inversely proportional to the pressure in the gas system depending on the sole use of gas production or pipeline facilities or the employment in conjunction with the gas production or pipeline facilities of gas holders respectively.

It is a further object of the present invention to provide a gas consumer an indication of demand on the gas distribution system.

It is a related object of the present invention to provide methods and apparatus for determining user charges in a gas system reflecting overall demand on the system and quantity of gas utilized and which pricing structure has the effect of leveling peak demands.

These and further objects and advantages of the present invention will become more apparent upon reference to the following specification, appended claims and drawings wherein:

FIG. 3 is an enlarged fragmentary cross-sectional view of a portion of the device illustrated in FIG. 1;

FIG. 4 is an enlarged cross-sectional view thereof taken about on line 4—4 in FIG. 3;

FIG. 5 is a view similar to FIG. 4 illustrating another position of the mechanism of FIG. 4; and FIG. 6 is a view similar to FIG. 3 illustrating a further embodiment hereof;

Figure 1:
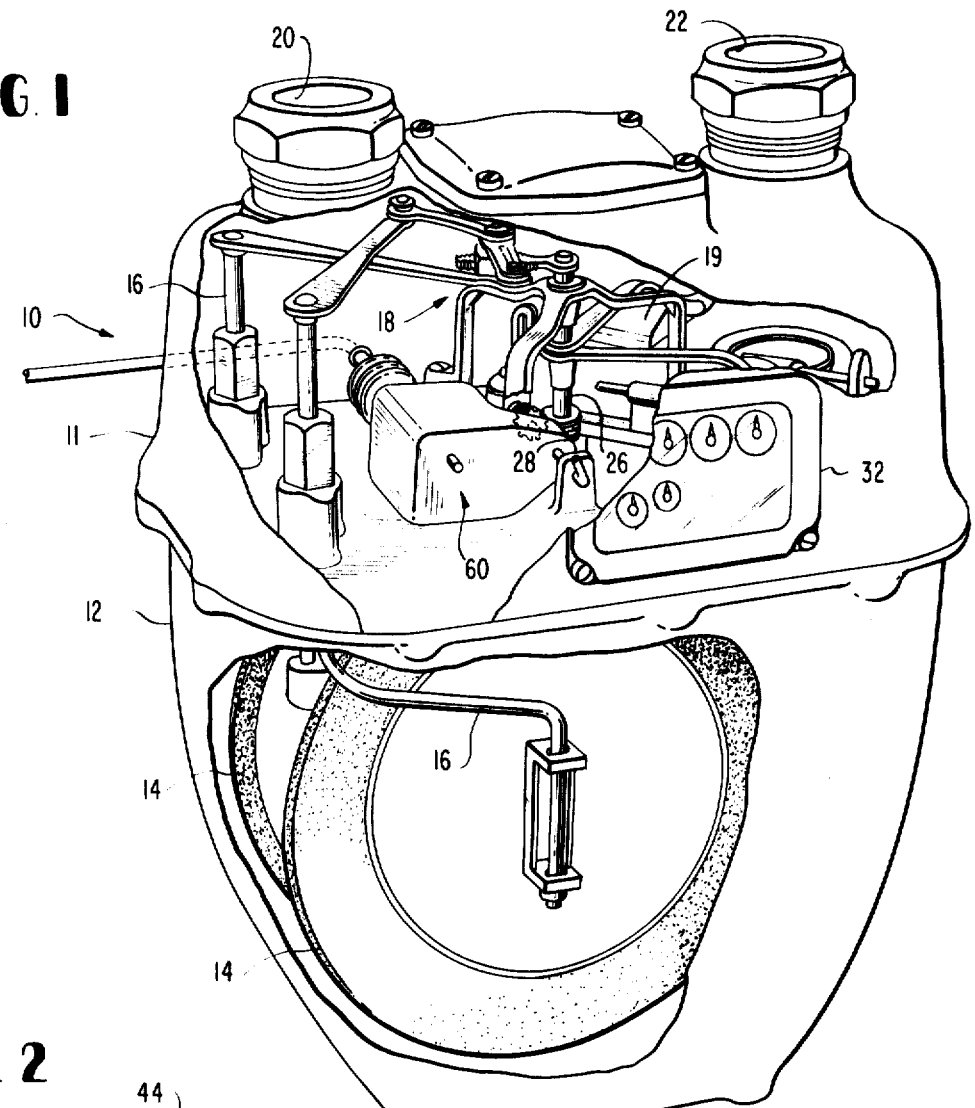
FIG. 1 is a perspective view of a measuring device constructed in accordance with the present invention with parts broken out and in cross section for ease of illustration.

Referring now to the drawings, particularly to FIG. 1, there is illustrated a pressure demand meter for fluid flow measurement constructed in accordance with the present invention and generally indicated at 10. It will be appreciated that the present invention could be utilized in the flow measurement of a wide variety of fluids. It is however, particularly well-suited for use in the measurement of natural gas flow and will be hereinafter described with respect to natural gas although not limited thereto. The illustrated pressure demand meter 10 includes portions of a conventional gas meter 12 which may be of the double diaphragm displacement type having a pair of diaphragms 14 and flag rods 16 coupled to diaphragms 14. As will be appreciated, the diaphragms 14 are disposed in a bowl type body having a pair of chambers with a centrally disposed plate, not shown, dividing the bowl into the chambers. The upper ends of flag rods 16 are coupled through a linkage assembly, generally indicated 18, which drives a pair of valves, one of which is illustrated at 19. The gas flowing into the meter through a gas inlet 20 drives the diaphragms and operates the valves through the rods 16 and linkage assembly 18 such that a measured quantity of gas flows through outlet 22. Operation of this type of gas meter is well known in the art and this particular meter is fully disclosed, for example, in catalog No. M1001 published by Rockwell Manufacturing Company. It is sufficient for present purposes to note that the oscillatory movement of flag rods 18 is converted to rotary movement of a central shaft 26 through link mechanism 18. In conventional meters, shaft 26 carries a lower gear 28 which lies in mesh with a gear 30. Normally gear 30 drives a shaft which, in turn, is coupled to a register 32 whereat the rotary movement of shaft 26 which is directly proportional to the quantity of gas flowing through the gas meter is converted to a numerical readout, for example, in terms of cubic feet of gas flowing through the meter.

Figure 2:
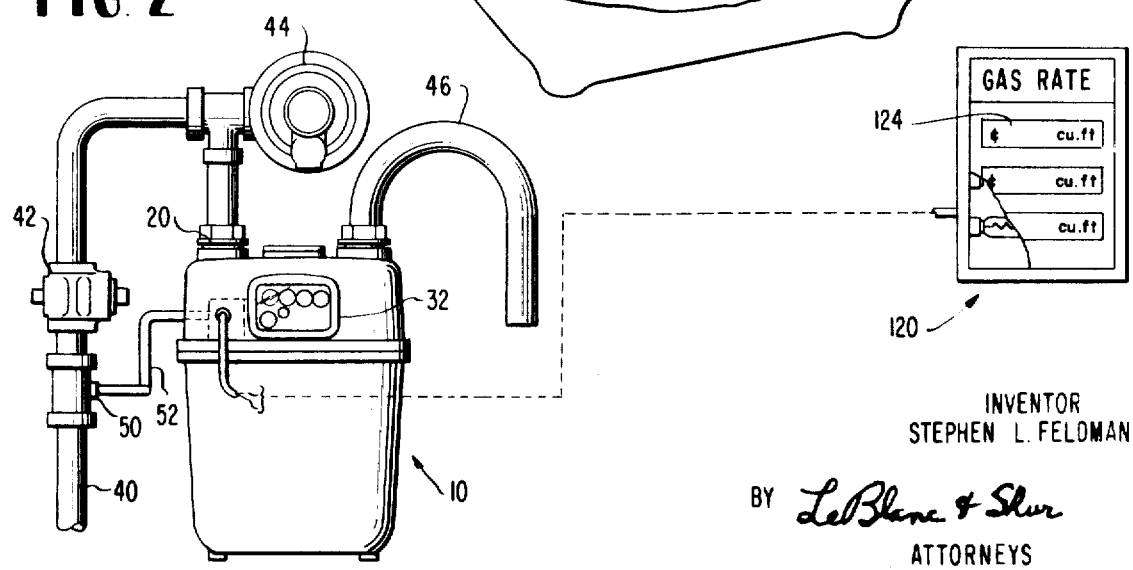
FIG. 2 is a reduced fragmentary view of the device disposed in a specified fluid line and including a remote reading indication of the demand on the fluid distribution system.

Referring now to FIG. 2, the pressure demand meter 10 is illustrated as installed in a users line with natural gas being supplied through a distribution line 40. As is conventional, a shutoff cock 42 and a regulator 44 are disposed in distribution line 40 with the regulator functioning to decrease the line pressure in distribution line 40 to a lower pressure compatible with the consumers gas appliances. Thus, the gas flowing in distribution line 40 enters the gas meter through inlet 20 at a decreased pressure and is metered to an outlet conduit 46 (coupled to a users gas consuming appliances) by operation of the diaphragms 14, linkage assembly 18 and valves 20. The quantity of gas flowing through the meter is, of course, indicated at register 32. It will be appreciated that the conventional register for gas meters includes a plurality of dials which record the quantity of gas flow through the meter in cubic feet, pounds, gallons or any other suitable unit of measurement. Visual readouts, other than dial indicators, can be provided, for example, combined numerical counter and dialing indicator hand could be provided as desired.

In accordance with the present invention, the quantity of gas measured as indicated at register 32, for a given quantity of gas flow through the meter is altered in accordance with the overall on the gas distribution system. To this end, a pressure tap 50 is provided on distribution line 40 at a point ahead of regulator 44. As indicated previously, the pressure in distribution line 40 provides an indication of the total demand on the gas distribution system. Under normal conditions, when only production and/or pipeline facilities are providing gas to the distribution system, the pressure in line 40 is inversely proportional to system demand. To correlate the system demand, i.e., the pressure in line 40 with the quantity register 32, pressure tap 50 includes a conduit 52 in communication with a bellows 54 disposed within meter housing 11. As the gas pressure in the upper portion of housing 11 is substantially constant, bellows 54 will expand and contract in an axial direction, as indicated by the arrows in FIG. 3, in response to increasing or decreasing pressures in the distribution system respectively. Thus, bellows 54 expands and contracts in response to low and high system demands respectively.

Referring now to FIGS. 1 and 3, a variable transmission, generally indicated 60, is interposed between the output gear 30 and the input 62 (FIG. 3) for the register 32. As will be appreciated, the conventional gas meter normally includes a shaft connecting between gear 30 and register 32 whereby register 32 records directly the quantity of gas flowing through the meter. By interposing a variable transmission between output gear 30 and register 32 and which transmission is functionally related to the pressure in the system, demand on the system can be correlated with the quantity measurement to provide an output at register 32 in demand-quantity units directly proportional to the quantity of gas flow into the users line 46 (FIG. 2) and inversely proportional to the overall system demand. To this end, variable transmission 60 includes a pair of shafts 64 and 66 in axial alinement one with the other, opposite ends of the respective shafts being journaled in suitable portions of the meter indicated at 67. Gear 30 is fixed on shaft 64. A gear 68 is disposed on the end of shaft 64 and carrys an elongated hub 70 for rotatably mounting the other end of shaft 66. Fixed for rotation with shaft 66 is a stepped gear 72 mounting a plurality of gear teeth 74, 76 and 78 thereabout at axially spaced positions one from the other, the gear teeth 74, 76 and 78 having decreasing diameters in a direction toward the end of shaft 66 remote from register 32.

Variable transmission 60 also includes a sleeve 80 journaled in suitable bearings 79 in meter housing 11 and having a cylindrical opening 81. Sleeve 80 includes an enlarged diameter portion comprising a gear 82 lying in meshing engagement with gear 68 on output shaft 64, whereby rotation of shaft 64 continuously drives sleeve 80. Sleeve 80 also includes a reduced diameter shaft portion 84 on which are mounted a plurality free wheeling gears 86, 88 and 90. Gears 86, 88 and 90 have different diameters and the smallest diameter gear 84 lies in constant meshing engagement with gear teeth 74 on gear 72. Gear 88 has a diameter intermediate the diameter of gears 86 and 90 and lies in constant meshing engagement with the intermediate teeth 76 on gear 72. The largest diameter gear 90 lies in constant mesh with the smallest teeth 78 on gear 72.

One end of bellows 54 is coupled to a shaft 92 having a bulbous or diametrically enlarged portion 94 intermediate its ends. Bulbous portion 94 lies within the opening 81 through sleeve 80 and is movable axially with respect thereto. It will be appreciated that any rotary movement of shaft 64 is also imparted to sleeve 80 through gear 68 and 82. However, since gears 86, 88 and 90 are free wheeling on sleeve 80, sleeve 80 will rotate relative to gears 86, 88 and 90 in the absence of connection between sleeve 80 and any one or more of gears 86, 88 and 90. Thus, to afford a driving connection between sleeve 80 and shaft 66 for driving register 32, a plurality of triangularly shaped circumferentially spaced cutouts 96 are formed along the inner edge of each gear 86, 88 and 90 about the openings therethrough which receive sleeve 80. Sleeve 80 carries sets of radially movable, circumferentially pins at axially spaced positions therealong corresponding to the axial spacing of gears 86, 88 and 90 each from the other. Particularly, and referring to FIGS. 4 and 5, each pin 98 includes a conical head 100 which, when displaced into its outermost radial position as illustrated in FIG. 4, engages within one of the triangularly shaped cutouts 96 of the associated gear 86, 88 or 90. Pins 98 slide in bores 102 formed in sleeve 80 and, when lying in their innermost position as seen in FIG. 5, the inner ends of the shank portions 101 of pins 98 project within the opening 81 through sleeve 80.

It will be appreciated that the axial position of bulbous portion 94 of shaft 92 determines which of gears 86, 88 or 90 will be engaged for rotation with sleeve 80. For example, as illustrated in FIG. 3, bulbous portion 94 lies in an axial position in engagement with the pins 98 associated with intermediate gear 88. In this position, the conical heads 100 of pins 98 are cammed outwardly by bulbous portion 94 to engage within the triangular cutouts 96 on gear 88. Gear 88 will accordingly rotate with sleeve 80 in response to rotary movement of shaft 64. Since gear 88 lies in constant meshing engagement with the teeth 76 on gear 72, shaft 66 is also driven with the result that counter 32 is driven. When shaft 92 is shifted axially from the illustrated position by expansion or contraction of bellows 54 in response to a respective increase or decrease in pressure in line 40, bulbous portion 94 will engage another set of pins 98. For example, when an increase in pressure in supply line 40 is sensed by bellows 54, shaft 92 moves axially to the right as seen in FIG. 3 such that bulbous portion 94 engages the pins 98 associated with gear 86. Conversely, when the pressure in supply line 40 decreases, bellows 54 will contract displacing shaft 92 axially to the left as seen in FIG. 3 moving bulbous portion 94 into engagement with the pins 98 associated with gear 90. It will be appreciated that, when gear 86 is engaged for rotation with sleeve 80, it drives the largest diameter teeth 74 on gear 72 thereby rotating shaft 66 at a predetermined rate with register 32 indicating in quantity units a given quantity of gas flow through the meter. When intermediate gear 88 is engaged with sleeve 80 and gear 72 is driven via teeth 76, shaft 66 is rotated at a faster predetermined rate and register 32 will indicate a larger number of quantity units for the same given quantity of gas flow through the meter. Similarly, when gear 90 is engaged with sleeve 80 in response to displacement of bulbous portion 94 to the left which in turn is in response to a sensing by bellows 54 of low pressure in supply line 40, shaft 66 is driven at an even higher predetermined speed through the engagement of gear 90 with teeth 78 of gear 72. Register 32 will therefore indicate an even larger number of quantity units for the same given quantity of gas flow through the meter.

Variable transmission 60 thus provides at register 32 a stepped correlation between the quantity measured and the pressure or demand in the gas system. When the shaft 92 is displaced to the left (FIG. 3) in response to a sensing of high system demand, i.e., a sensing of low pressure in line 40, the units registered at register 32 in terms of quantity of gas flow through the meter will be relatively higher than the units registered for a like quantity of gas flow through the meter at low system demand i.e., when shaft 92 is displaced to the right (FIG. 3) in response to a sense of high pressure in service line 40. Conversely, at low system demand the quantity units registered will be relatively lower for a given quantity of gas flow through the meter than the quantity units registered for a like quantity of gas flow through the meter at high system demand.

To prevent disposition of bulbous portion 94 within sleeve 80 at locations between the sets of pins 98, a ball detent 110 is provided. Particularly, shaft 92 carries a plurality of diametrically enlarged axially spaced circumferential grooves 112. A ball 114 is biased into engagement with one of the grooves 112 by a spring 116. The detented positions of shaft 92 correspond to the positions of alinement of bulbous portion 94 and the sets of pins carried on sleeve 80.

To provide an indication to a gas user of the demand on the system at a location remote from the meter such that his decision to utilize or not to utilize gas at any particular time can be made with knowledge of the effect of such decision on the cost of utilizing the gas at that particular time, a remote indication, generally indicated 120 in FIG. 2, is provided. The remote indicator 120 can be located at a convenient place preferably adjacent the users valves for his gas consuming devices. The remote indicator 120 may be graduated in terms of actual cost per quantity of gas utilized corresponding to the demand on the system at any particular time, i.e., the users marginal cost for using gas at a particular time with a specified demand on the system. For example, remote indicator 120 may have, as indicated in FIG. 2, three indicators providing the consumer with actual dollar costs per quantity utilized at three different demands on the system. At high demand, i.e. low system pressure, the remote indicator can indicate a particular marginal cost to the consumer whereas at low demand, i.e., high system pressure, the remote indicator will indicate a lower marginal cost to the consumer. To accomplish this, the indicators may comprise lamps 124a, 124b, and 124c disposed behind translucent plates imprinted with the actual marginal costs and connected through open contacts 126a, 126b, and 126c with a battery source 128. A strip of conductive material 130 is provided on the end of shaft 92 and engages between a selected pair of contacts in accordance with the axial position of shaft 92 which position, as indicated previously, is indicative of the demand on the system. Hence, at low demand, i.e., high pressure in line 40, lamp 124a is lit indicating to the consumer a low marginal cost should he utilize gas at that time. At high demand, i.e., low pressure in the system, the lamp 124c would be lit indicating to the consumer a higher marginal cost should he utilize gas at that time. Thus, the consumer can make his decision as to whether to utilize or not utilize gas at any particular time with knowledge of the relative costs to him should he use gas at that time as compared with using gas at another time.

It will be appreciated that the variable transmission, while described with respect to three demand or pressure positions, could employ any number of steps as desired. That is to say, a greater number of variations in the quantity units registered at register 32 in response to a greater number of demand levels could be provided simply by increasing the number of gears in transmission 60. Also, a continuously variable transmission in contradistinction to the stepped transmission herein described and illustrated could be provided. Such a continuous transmission may be of the type described and illustrated in my copending U.S. Pat. application Ser. No. 17,073 filed Mar. 6, 1970 and the disclosure of that application is incorporated herein by reference thereto as though fully set forth herein. Furthermore, it will be appreciated that remote indicator 120 may likewise include a greater number of indicators 124 to indicate a greater number of demand levels. Moreover, other types of dial indicators could also be utilized in lieu of the indicator specifically described and illustrated herein and that such indicators, rather than indicate actual dollar costs per quantity of gas utilized, could simply indicate the relative marginal cost in any point in time.

In the systems wherein gas is provided during peak demand periods from gasholders or storage tanks, the pressure in the supply line 40 when gas in such storage tanks or gas holders is utilized will be increased beyond the normal gas pressure obtaining in the system when gas is drawn solely from production or pipeline facilities. In this form of the invention, there is provided a mechanism which will provide a quantity readout at register 32 directly proportional to demand on the gas system in the manner previously described when gas is supplied solely from production or pipeline facilities. In this form, however, an indication of increased demand is provided when the gas distribution lines are packed with gas from the gasholders or gas storage tanks. Since gas from the gasholders is pumped into the gas distribution system at peak demand times, the pressure in the system when such pumping occurs at peak demand times will increase beyond the average pressure normally in the gas system when supplied with gas solely from production or pipeline facilities. The mechanism illustrated in FIG. 3 senses the increase in pressure beyond the normal gas system pressure and operates to drive the quantity-units register 32 at an increased rate similarly as when low pressure, high demand is sensed in the system when production or pipeline facilities are used solely in supplying gas to the distribution system.

To this end, there is added to the device shown in FIG. 3 a fourth gear 130. Since the mechanism illustrated in FIG. 6 is additive to the previously described and illustrated mechanism, identical reference numerals are utilized and the parts so referenced operate identically as previously described. Gear 130 carries triangular shaped cutouts about its bore about shaft 80 identically as gears 86, 88 and 90 are provided with cutouts 96. A further set of pins 98, which are operable to selectively couple gear 132 to sleeve 80, are located at a position corresponding to the furthest axial extent of shaft 92. That is to say, when the high pressure in supply line 40 due to packing of the lines is sensed by bellows 54, the shaft 92 will be displaced to the right as seen in FIG. 6 such that bulbous portion 94 engages the set of pins 98 associated with gear 130. Outward displacement of these pins will, similarly as previously described, engage their conical heads 100 within the triangularly shaped cutouts of gear 130 thereby coupling gear 130 to sleeve 80.

There is also provided on gear 72 an end reduced diameter portion 131 carrying teeth 132 which lie in continuous meshing engagement with gear 130. Thus, higher than normal pressure in the gas distribution system due to packing of the lines by pumping gas from gasholders and which pressure is therefore indicative of a period of high demand for gas will result in driving register 32 at a relatively faster rate such that the increase in the rate of quantity units registered at register 32 is directly proportional to demand. That is to say, register 32, at this high demand level and high pressure, will indicate a larger number of quantity units for a given quantity of gas flow through the meter than it would register at a normal average demand level, i.e., average high pressure, for a like quantity of gas flow through the meter where gas is supplied solely from pipeline or production facilities.

In utilizing this form of the invention, the gears are set such that the bulbous portion 94 preferably engages the pins associated with gear 86, i.e., couples sleeve 80 to gear 86, in response to a normal range of pressures, below peak pressures, in gas supply line 40. Should the pressure of the gas supplied by the production or pipeline facilities decrease, which indicates higher demand, shaft 92 will shift to the left as previously described to provide the indication of higher demand at the remote register as previously described and also to increase the rate at which the register 32 registers the quantity of gas flowing through the gas meter. Should the gas lines be packed, shaft 92 shifts to the right in FIG. 6 to its extreme position to couple sleeve 80 to gear 130 thereby also increasing the rate at which register 32 registers the quantity of gas flowing through the meter. In this latter form, another pair of contacts 136 are connected with lamp 124c. Thus, a remote indication of the high demand on the system at the higher than average pressure in line 40 is also provided.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a gas system having a plurality of gas distribution conduits, a measuring device comprising; means for sensing the demand on the gas system, means coupled to said sensing means to provide an output signal proportional to said system demand, means for sensing the quantity of gas flowing through a specified conduit for a given time period, means coupled to said latter sensing means to provide an output signal proportional to the quantity of gas flow through the specified conduit, and means for correlating said output signals to provide an indication proportional to the quantity of gas utilized and the system demand.

2. The device according to claim 1 including a register, said indication being displayed at said register in quantity units.

3. The device according to claim 1 including a remote register, means for coupling said remote register to said device to provide a remote indication of system demand.

4. The device according to claim 1 wherein said sensing means senses the gas pressure in a specified conduit, said gas pressure being a variable, said correlating means being operable to provide an indication proportional to the quantity of gas utilized and inversely proportional to said gas pressure.

5. The device according to claim 4 wherein said correlating means is operable to provide the indication proportional to the quantity of gas utilized and inversely proportional to said gas pressure for gas pressures within a predetermined range, said correlating means being operable to provide an indication proportional to the quantity of gas utilized and directly proportional to said gas pressure for gas pressures above said predetermined range of gas pressures.

6. In a gas system having a plurality of gas distribution conduits, the method of determining user charges for gas flowing through a users conduit as a function of system demand and quantity of gas utilized comprising the steps of;

sensing the gas system demand and providing an output signal proportional thereto;

sensing the quantity of gas flowing through a users conduit for a given period of time and providing an output signal proportional thereto, correlating said output signals to provide an indication proportional to the quantity of gas utilized and system demand; and calculating a charge to a gas system user based on the net change in said latter indication for the given time period.

7. A gas flow measuring device comprising: sensing means for measuring the quantity of gas flow in a gas line and providing an output signal proportional to the quantity of gas flowing through the gas line, means for sensing the pressure of the gas and providing an output signal proportional to such pressure, a register, and means for processing said quantity flow signal and said pressure signal to provide an indication at said register proportional to the quantity of gas flowing through said gas line and to the pressure of the gas, said processing means including means for correlating said quantity flow signal and said pressure signal to provide an indication at said register proportional to the quantity flow of gas through the line and inversely proportional to the pressure of the gas in the line.

8. A gas flow measuring device comprising: sensing means for measuring the quantity of gas flow in a gas line and providing an output signal proportional to the quantity of gas flowing through the gas line, means for sensing the pressure of the gas and providing an output signal proportional to such pressure, a register, and means for processing said quantity flow signal and said pressure signal to provide an indication at said register proportional to the quantity of gas flowing through said gas line and to the pressure of the gas, said processing means including a plurality of gears, said quantity signal being adapted to drive said gears, said gears having an output coupled to said register with said register having a readout in quantity units of flow through the line, means coupled to said pressure signal output for changing the gear ratio of said gears to alter the quantity readout in proportion to the pressure in the gas line, said coupling means being adapted to change the gear ratio of said gears to alter the quantity readout in an inverse proportion to the pressure in the gas line.

* * * * *

UNITED STATES PATENT OFFICE
CERTIFICATE OF CORRECTION

Patent No. 3,675,480   Dated July 11, 1972

Inventor(s)   Stephen Lew Feldman

It is certified that error appears in the above-identified patent and that said Letters Patent are hereby corrected as shown below:

In Column 4, line 15, "combined" should read --a combined--; line 20, "overall" should read --overall demand--; line 70, "plurality" should read --plurality of--.

In Column 5, line 17, "circumferentially pins" should read --circumferentially spaced pins--.

Signed and sealed this 2nd day of January 1973.

(SEAL)
Attest:

EDWARD M. FLETCHER, JR.
Attesting Officer

ROBERT GOTTSCHALK
Commissioner of Patents